US009705958B2

(12) United States Patent
Ando

(10) Patent No.: US 9,705,958 B2
(45) Date of Patent: Jul. 11, 2017

(54) TRANSMISSION APPARATUS, TRANSMISSION METHOD, COMPUTER-READABLE STORAGE MEDIUM STORING TRANSMISSION PROGRAM, AND RELAY SYSTEM

(71) Applicant: NEC CORPORATION, Tokyo (JP)

(72) Inventor: Kyohei Ando, Tokyo (JP)

(73) Assignee: NEC CORPORATION, Tokyo (JP)

( * ) Notice: Subject to any disclaimer, the term of this patent is extended or adjusted under 35 U.S.C. 154(b) by 333 days.

(21) Appl. No.: 14/467,183

(22) Filed: Aug. 25, 2014

(65) Prior Publication Data
US 2015/0074265 A1 Mar. 12, 2015

(30) Foreign Application Priority Data
Sep. 10, 2013 (JP) .................................. 2013-186843

(51) Int. Cl.
G06F 15/173 (2006.01)
H04L 29/08 (2006.01)
(52) U.S. Cl.
CPC .......... H04L 67/02 (2013.01); H04L 67/2828 (2013.01)
(58) Field of Classification Search
CPC .......................... H04L 67/02; H04L 67/2828
See application file for complete search history.

(56) References Cited

U.S. PATENT DOCUMENTS

| 9,356,947 B2* | 5/2016 | Shraim | H04L 12/585 |
| 2012/0033757 A1* | 2/2012 | Itou | H04L 41/069 |
| | | | 375/295 |
| 2015/0227406 A1* | 8/2015 | Jan | G06F 11/0709 |
| | | | 714/37 |

FOREIGN PATENT DOCUMENTS

| JP | 2002-123498 | 4/2002 |
| JP | 2003-308444 | 10/2003 |
| JP | 2007-299019 | 11/2007 |
| JP | 2009-009541 | 1/2009 |
| JP | 2009-163393 | 7/2009 |
| JP | 2010-134705 | 6/2010 |
| JP | 2010-198191 | 9/2010 |

OTHER PUBLICATIONS

WebOTX_Enterprise_Service_Bus (NEC Corporation), <URL:http://jpn.nec.com/webotx/integration/function/1>.
Sun GlassFish Enterprise Service Bus (ESB) (Oracle Corporation), URL:http://www.oracle.com/us/products/030605.htm>.
Oracle_Enterprise Service_Bus (Oracle Corporation) <URL:http://docs.oracle.com/cd/E21043_01/integrate.1111/b62261/service_bus.htm#BABDFJFFI>.

* cited by examiner

*Primary Examiner* — John B Walsh
(74) *Attorney, Agent, or Firm* — Young & Thompson

(57) ABSTRACT

Disclosed is a transmission apparatus or the like that is able to transmit information efficiently. The transmission apparatus, on the basis of history information which includes a service identifier and a message identifier associated therewith, transmits a difference between a third message having a large similarity ratio to a second message included in a specific service and the second message, and a message identifier identifying the second message via a communication network.

10 Claims, 12 Drawing Sheets

Fig. 3

```
<?xml version="1.0" encoding="UTF-8"?>
<soapenv:Envelope xmlns:soapenv="http://schemas.xmlsoap.org/soap/envelope/">
  <soapenv:Header />
  <soapenv:Body>
    <foo:operation xmlns:hoge="http://foo.com">
      <bar:list xmlns="http://bar.com">
        <bar:abc>ghi<bar:abc>
      </bar:list>
    </foo:operation>
  </soapenv:Body>
</soapenv:Envelope>
```

Fig. 4

| SERVICE IDENTIFIER | MESSAGE IDENTIFIER |
|---|---|
| 1 | A |
| 2 | B |
| 2 | C |
| ... | ... |

Fig. 5

```
<?xml version="1.0" encoding="UTF-8"?>
<soapenv:Envelope xmlns:soapenv="http://schemas.xmlsoap.org/soap/envelope/">
  <soapenv:Header />
  <soapenv:Body>
    <foo:operation xmlns:hoge="http://foo.com">
      <bar:list xmlns="http://bar.com">
        <bar:abc>def</bar:abc>
      </bar:list>
    </foo:operation>
  </soapenv:Body>
</soapenv:Envelope>
```

TRANSMISSION APPARATUS, TRANSMISSION METHOD, COMPUTER-READABLE STORAGE MEDIUM STORING TRANSMISSION PROGRAM, AND RELAY SYSTEM

This application is based upon and claims the benefit of priority from Japanese Patent Application No. 2013-186843, filed on Sep. 10, 2013, the disclosure of which is incorporated herein in its entirety by reference.

TECHNICAL FIELD

The present invention relates to a transmission apparatus or the like, for example, managing or mediating a service.

BACKGROUND ART

A communication network on which information is transmitted and received among the plurality of locations is necessary to assemble a service with distributed services provided at a plurality of locations (e.g. Tokyo and Osaka). The communication network, however, does not always have a wide enough communication bandwidth. Therefore, a sufficiently wide communication bandwidth on the communication network is not always secured when the service is provided.

In Service-Oriented Architecture (hereinafter, abbreviated as "SOA"), a function corresponding to a process step in an operation is regarded as a service. Moreover, in SOA, the overall system is assembled by making the services coordinated with one another on the communication network.

Extensible Markup Language (hereinafter, abbreviated as "XML") is a language employed when, for example, a system based on SOA is assembled. However, a document described XML (hereinafter referred to as "XML document") includes formal descriptions such as a tag.

Efficient XML Interchange (hereinafter, abbreviated as "EXI") is a technology reducing formal descriptions in an XML document. EXI compresses an XML message such as a document described in XML by reducing formal descriptions. In EXI, it takes a lot of calculation to compress the XML message, and, furthermore, file size after compression is not sufficiently small.

In a system based on SOA, the XML document defining the system contains formal descriptions. Furthermore, in a system based on SOA, because schema of the XML document is defined for each service, messages associated with an identical service are similar to one another. In addition, a communication network does not always have a wide enough communication bandwidth. Therefore, in a system based on SOA, it is necessary to use the communication bandwidth efficiently.

A data communication system disclosed in Patent Document 1 (Japanese Patent Application Laid-Open No. 2007-299019) or a communication data reduction method disclosed in Patent Document 2 (Japanese Patent Application Laid-Open No. 2003-308444) reduces communication volume for transmitting and receiving information via a communication network.

The data communication system disclosed in Patent Document 1, when requested data is transmitted, generates differences between the data to be transmitted and all data stored in a cache, and transmits a difference with the smallest size among the generated differences and an identifier identifying the data from which the smallest difference is produced. By the data communication system, communication volume is reduced.

The communication data volume reduction method disclosed in Patent Document 2 is a method in which, when a message for a transaction is transmitted, difference information between a message for any of past transactions and the message for the transaction is generated with conforming to a standard specification for BtoB (business to business) and the generated difference information is transmitted to a transaction partner. By the method, communication data volume in electronic commerce is reduced.

Patent Documents 3 to 7 also disclose technologies related to the present invention.

A communication control apparatus disclosed in Patent Document 3 (Japanese Patent Application Laid-Open No. 2002-123498) forms a group with users identified by user identifiers which are included in user identifiers that identify users belonging to a group and also included in user identifiers associated with users who can be communicated with. The communication control apparatus keeps shared data of a collaborative operation support system, which halts execution temporarily, correct and consistent after the execution is resumed.

An operation support system disclosed in Patent Document 4 (Japanese Patent Application Laid-Open No. 2010-198191) includes an operation history database capable of storing a history of operations carried out by a user in the past, a similar history extraction unit that extracts a history of operations similar to a history of operation carried out by the user most recently from the operation history database, a characteristics quantity calculation unit that calculates characteristics quantity of the extracted history, and a similarity ratio calculation unit that calculates a similarity ratio between characteristics quantity calculated in the past and the characteristics quantity of the extracted history. The operation support system, even if a menu selected by a user does not include information related an intention of the user, estimates the intention of the user in the menu selection phase.

A logging control apparatus disclosed in Patent Document 5 (Japanese Patent Application Laid-Open No. 2010-134705) includes an event recording unit that stores a history of events taking place in a device into history information and, when a malfunction takes place in the device, if it is decided that log information needs to be recorded based on a result of comparison between events which take place after the malfunction and events included in the history information, generates a log on the events. In other words, the logging control apparatus generates a log which can be referred to in malfunction analysis.

An information processing apparatus disclosed in Patent Document 6 (Japanese Patent Application Laid-Open No. 2009-163393) includes an acquisition unit that acquires, from history information on sent electronic mail messages, first history information including, as the destination thereof, a portion of destinations of an electronic mail message commanded to be sent, a calculation unit that calculates a similarity ratio between character data in the electronic mail message commanded to be sent and character data included in the first history information, and a warning unit that issues warning information when the similarity ratio does not satisfy a predetermined condition. In other words, the information processing apparatus decreases wrong transmission by issuing warning information when there is no record of sending an electronic message having a similar subject or text even if there is a record of sending a message to the destination address.

An authentication system disclosed in Patent Document 7 (Japanese Patent Application Laid-Open No. 2009-009541) decides that, when it is decided that specific history information in history information of the authentication apparatus and history information designated by specification information which designates the specific history information in the history information have common information, the terminal is a legitimate terminal. The authentication system carries out authentication between a plurality of users or terminals.

BRIEF SUMMARY OF THE INVENTION

Problem to be Solved by the Invention

The data communication system disclosed in Patent Document 1 calculates a difference from target data for every piece of data included in the history information. Therefore, in the data communication system, processing volume for calculating the differences is substantial.

On the other hand, the communication data volume reduction system disclosed in Patent Document 2 calculates a similarity ratio between data included in the history information and target data and calculates a difference between a piece of data the calculated similarity ratio of which is large and the target data. Processing volume of the calculating a similarity ratio is smaller than processing volume of calculating a difference. Therefore, the communication data volume reduction system transmits a difference to a communication destination with fewer processing volume than the data communication system disclosed in Patent Document 1. However, even in the communication data volume reduction system disclosed in Patent Document 2, processing volume in the calculation processing of a similarity ratio is still substantial.

Accordingly, a one of object of the present invention is to provide a transmission apparatus or the like that makes it possible to transmit information efficiently.

SUMMARY

In order to achieve the above-mentioned object, as an aspect of the present invention, a transmission apparatus according to the present invention includes;

a selection unit that, from history information associated with a service identifier identifying a service and a message identifier identifying a message, selects, as a first message identifier, the message identifier which is associated with a specific service identifier specifying a specific service; and a transmission unit that transmits, via a communication network, a difference between a second message and a third message which is a message having a large similarity ratio in first messages associated with the first message identifier, the similarity ratio indicating a degree of similarity to a second message related to the specific service, and the message identifier associated with the second message as a specific message identifier.

As another aspect of the present invention, a transmission method according to the present invention includes;

selecting, from history information associated with a service identifier identifying a service identifying a message identifier identifying a message, a first message identifier associated with a specific service identifier associated with a specific service; and transmitting, via a communication network, a difference between a second message and a third message which is a message having a large similarity ratio in first messages associated with the first message identifier, the similarity ratio indicating a degree of similarity to a second message related to the specific service, and a specific message identifier associated with the second message.

Furthermore, the object is also realized by a transmission program, and a non-transitory computer-readable recording medium which records the memory management control program.

According to the transmission apparatus or the like of the present invention, it is possible to decrease the degradation of the processing performance.

A transmission apparatus or the like according to the present invention can transmit information efficiently.

BRIEF DESCRIPTION OF THE DRAWINGS

Exemplary features and advantages of the present invention will become apparent from the following detailed description when taken with the accompanying drawings in which:

FIG. 3 is a diagram conceptually illustrating an example of contents of a message.

FIG. 4 is a diagram conceptually illustrating an example of the history information according to the first exemplary embodiment.

FIG. 5 is a diagram conceptually illustrating an example of contents in a message.

EXEMPLARY EMBODIMENT

Next, exemplary embodiments of the present invention will be described in detail with reference to drawings.

<First Exemplary Embodiment>

Figure 1:
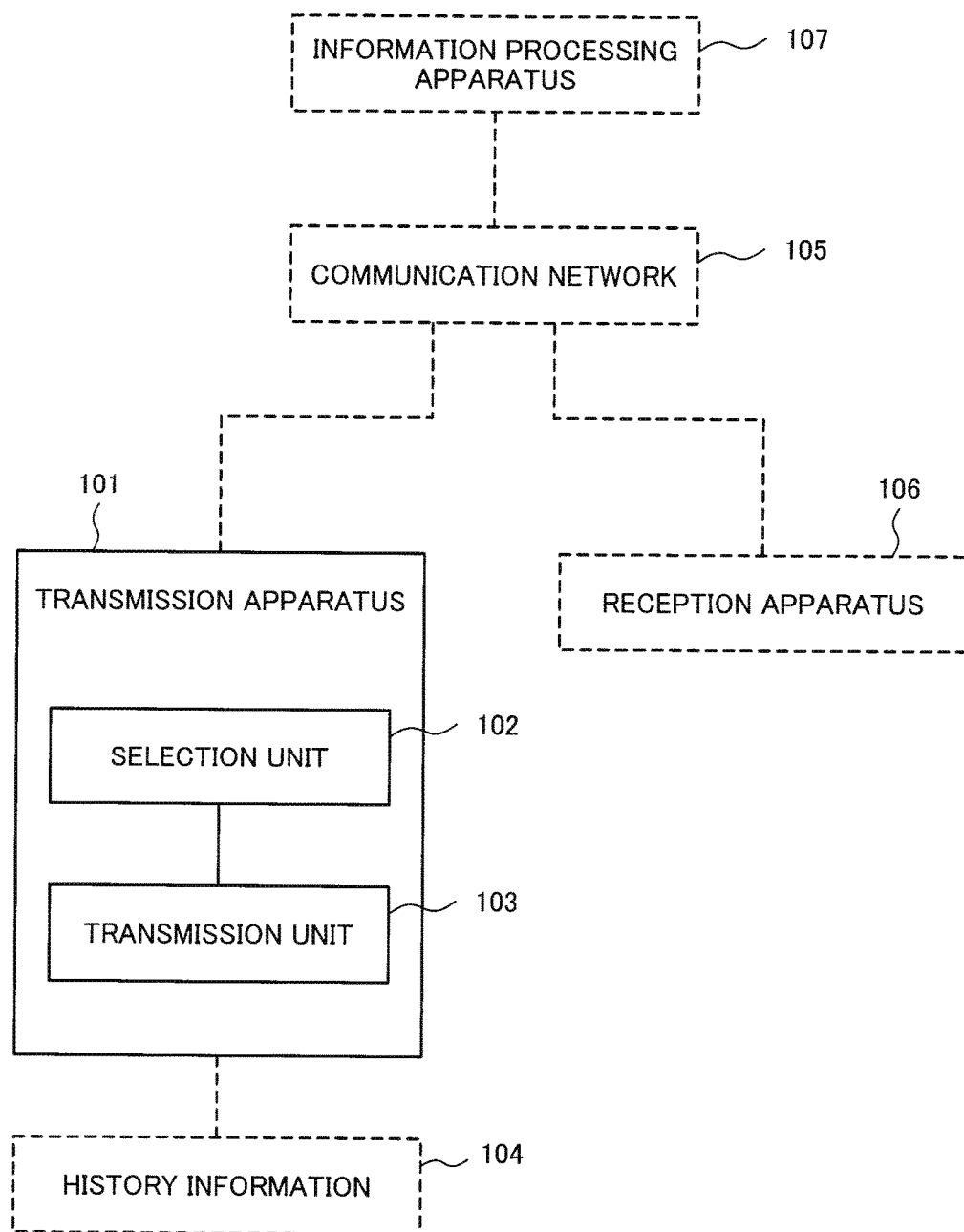
FIG. 1 is a block diagram illustrating a configuration which the transmission apparatus according to a first exemplary embodiment of the present invention has.
Figure 2:
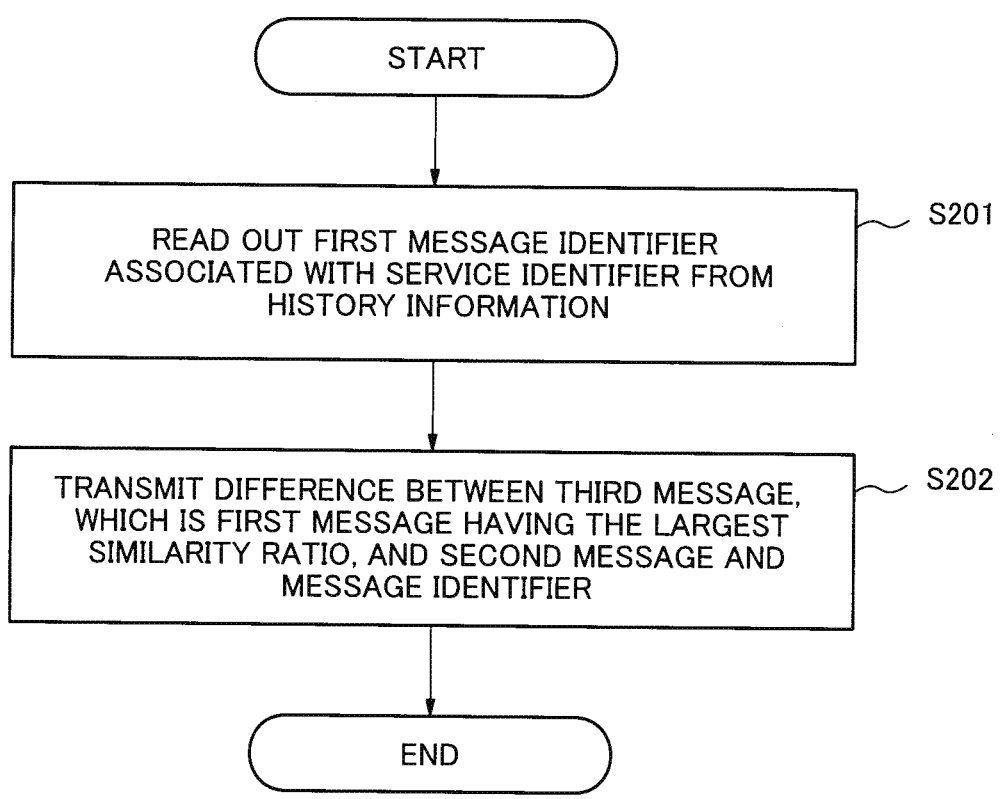
FIG. 2 is a flowchart illustrating a processing flow of the transmission apparatus according to the first exemplary embodiment.

A configuration of a transmission apparatus 101 and processing which carried out by the transmission apparatus 101 according to the first exemplary embodiment of the present invention will be described in detail below with reference to FIGS. 1 and 2. FIG. 1 is a block diagram illustrating a configuration which the transmission apparatus 101 according to the first exemplary embodiment of the present invention has. FIG. 2 is a flowchart illustrating a processing flow of the transmission apparatus 101 according to the first exemplary embodiment.

The transmission apparatus 101 according to the first exemplary embodiment includes a selection unit 102 and a transmission unit 103. The transmission apparatus 101, a reception apparatus 106, and an information processing apparatus 107 can transmit and receive information to/from one another via a communication network 105.

The transmission apparatus 101 and reception apparatus 106 may be installed at a plurality of separate locations (e.g. Tokyo and Osaka). The information processing apparatus 107 and the reception apparatus 106 may be installed at closer locations than the above-described locations. Furthermore, the transmission apparatus 101 and the information processing apparatus 107 need not be able to transmit and receive information directly.

In the following description, it is assumed, for descriptive purposes, that the information processing apparatus 107 requests a service A provided by the reception apparatus 106 by transmitting a message to the reception apparatus 106 via the transmission apparatus 101. It is also assumed that service bus apparatuses (not illustrated) are installed at all locations at which users and providers of a service are located.

A message contains a service identifier SI that uniquely identifies a service and information on the service (hereinafter, referred to as "contents") as exemplified in FIG. 3. For example, the service identifier of the "service A" is "A". FIG. 3 is a diagram conceptually illustrating an example of contents of a message. The contents exemplified in FIG. 3 are described by using Extensible Markup Language (hereinafter, abbreviated as "XML"). Because XML is a standard language, no detail description of XML is provided in this exemplary embodiment.

A message, however, need not necessarily be described by using XML.

The transmission apparatus 101 includes a service A definition unit that receives the service A (hereinafter, referred to as "Inbound"). The reception apparatus 106 includes the service A definition unit that calls the service A (hereinafter, referred to as "Outbound").

The Inbound receives a request and transfers the received request to the Outbound via the transmission apparatus 101 and the reception apparatus 106. Processing of the Inbound and Outbound is a basic function a standard service bus has (e.g. "distributed ESB function" in Non-Patent Documents 1 to 3). The above Non-Patent Documents 1 to 3 are as follows.

Non-Patent Document 1: WebOTX_Enterprise_Service_Bus (NEC corporation)<URL: http://jpn.nec.com/webotx/integration/function/1>

Non-Patent Document 2: Sun GlassFish Enterprise Service Bus (ESB) (Oracle Corporation)<URL: http://www.oracle.com/us/products/030605.htm>

Non-Patent Document 3: Oracle_Enterprise Service_Bus (Oracle Corporation)<URL: http://docs.oracle.com/cd/E21043_01/integrate.1111/b62261/service_bus.htm#BABDFJFFl>

Therefore, the basic function will not be described in this exemplary embodiment, and, in the following description, description on the Inbound and Outbound will also be omitted for descriptive purposes.

First, the transmission apparatus 101 receives a message from the information processing apparatus 107. Next, the selection unit 102 reads out a message identifier MI, which is associated with a service identifier SI contained in the message received by the transmission apparatus 101, from history information 104 exemplified in FIG. 4 (step S201). FIG. 4 is a diagram conceptually illustrating an example of the history information 104 according to the first exemplary embodiment. A message is associated with a message identifier MI which uniquely identifies the message.

The history information 104 associates a service identifier SI with a message identifier MI. For example, a service identifier SI of "1" is associated with a message identifier MI of "A". This association indicates that, in a service identified by the service identifier SI of "1", a message identified by the message identifier MI of "A" is transmitted and received. Similarly, for example, a service identifier SI of "2" is associated with a message identifier MI of "B". This association indicates that, in a service identified by the service identifier SI of "2", a message identified by the message identifier MI of "B" is transmitted and received.

In the following description, it is assumed that a message identified by the message identifier MI of "A" is a message containing the contents exemplified in FIG. 3 for descriptive purposes. It is also assumed that a message transmitted by the information processing apparatus 107 is a message containing contents exemplified in FIG. 5. FIG. 5 is a diagram conceptually illustrating an example of contents in a message. The contents exemplified in FIG. 5 are, as with the contents exemplified in FIG. 3, described by using XML.

For example, if a service identifier SI is "1", the transmission apparatus 101 reads out a message identifier MI of "A" associated with the service identifier SI of "1" from the history information 104 exemplified in FIG. 4.

Next, the transmission unit 103 calculates a similarity ratio between one or more messages identified by the message identifier MI of "A" (in this example, FIG. 3, and, hereinafter, also referred to as "first message(s)") and the received message (in this example, FIG. 5, and, hereinafter, also referred to as "second message").

In the following description, it is assumed, for descriptive purposes, that a similarity ratio takes a value from 0 to 1 and indicates higher similarity as it is closer to 1. Moreover, for example, if a similarity ratio between a first message and a second message is 1, the first message and the second message are the same (identical).

Hereinafter, it is assumed that an expression "similar" includes both meanings of being similar and being identical.

The transmission unit 103 determines a message with the largest calculated similarity ratio (hereinafter, also referred to as "third message"), and calculates a difference between the third message and the second message. In other words, the third message is a message that has the largest similarity ratio with the second message among the first messages. Next, the transmission unit 103 transmits the calculated difference and the message identifier MI (in this example, message identifier MI of "A") (step S202).

If a plurality of message identifiers MI are associated with the service identifier SI of "1" in the history information 104, the transmission unit 103 calculates a similarity ratio for each of the message identifiers MI.

For example, the transmission unit 103 calculates a similarity ratio based on Eq. 1.

(similarity ratio)=(the number of identical lines between a message and a second message)/(the total number of lines of contents in the second message)  (Eq. 1).

For example, the number of identical lines between the message exemplified in FIG. 3 and the second message is 10, and therefore the similarity ratio is calculated as 0.909 (=10/11).

Figure 6:
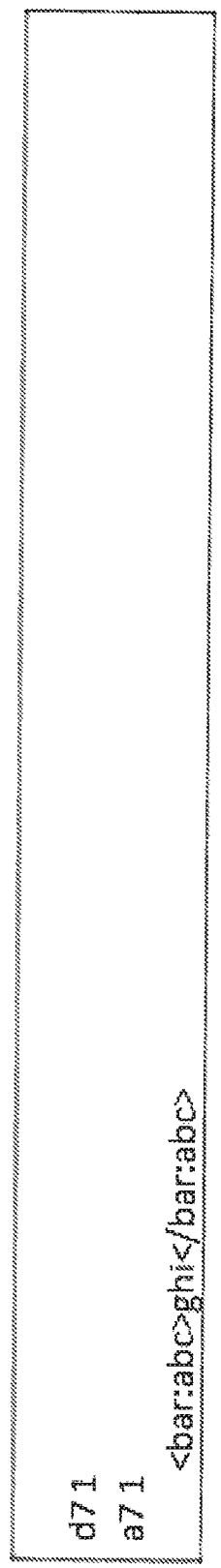
FIG. 6 is a diagram illustrating an example of a difference calculated by the transmission unit in accordance with RCS format.

For example, the transmission unit 103 may calculate a difference between the third message and the second message with the diff command which is a command that outputs differences in UNIX (a registered trademark). In this case, the transmission unit 103 generates information exemplified in FIG. 6 as the difference between the third message and the second message. FIG. 6 is a diagram illustrating an example of a difference calculated by the transmission unit 103 in accordance with RCS format.

The contents exemplified in FIG. 3 differ from the contents in FIG. 5 in respect of the seventh line. Therefore, the transmission unit 103 calculates "A" as a message identifier MI, and also calculates the difference illustrated in FIG. 6 as a difference.

The transmission unit 103 transmits the calculated message identifier MI of "A" and the difference to the reception unit 106 via the communication network 105.

The reception apparatus 106 receives the message identifier MI and the difference via the communication network 105. Next, the reception apparatus 106 generates a message on the basis of a message associated with the received message identifier MI and the difference. In the above-described example, the reception apparatus 106 generates a message containing the contents exemplified in FIG. 5 on the basis of the difference exemplified in FIG. 6 and the message identifier MI of "A".

Systems disclosed in Patent Documents 1 and 2 calculate a similarity ratio and a difference for every message identified by a message identifier MI included in history information. In other words, in the systems, the number of messages that are calculation targets is equal to the total number of messages included in the history information.

On the other hand, as described above, the selection unit 102 according to the exemplary embodiment reads out a message identifier MI associated with a service identifier SI contained in a second message from the history information 104. The transmission unit 103 calculates a similarity ratio for a message associated with the message identifier MI read out by the selection unit 102. Therefore, the number of messages for which the transmission unit 103 calculates similarity ratios is not the total number of messages included in the history information 104 but the number of messages identified by the message identifiers MI associated with the service identifier SI. In other words, the number of messages for which the transmission unit 103 calculates similarity ratios is less than the number of messages which are calculation targets of the systems disclosed in Patent Documents 1 and 2.

As a result, the transmission apparatus 101 according to the exemplary embodiment transmits information by fewer processing than the systems disclosed in Patent Documents 1 and 2. In other words, the transmission apparatus 101 according to this exemplary embodiment makes it possible to transmit information efficiently.

In the above description, the transmission unit 103 calculates a similarity ratio, selects a message with the largest calculated similarity ratio, and calculates a difference for the selected message. However, the transmission unit 103 may calculates the difference for a selected message without calculating the similarity ratio.

Moreover, the method of calculating a similarity ratio may be defined by using, for example, the number of characters, not the number of lines. Furthermore, the similarity ratio may be a similarity ratio calculated based on a feature quantity converted from a character string. In other words, the method of calculating a similarity ratio is not limited to the above-described example.

Although, in the above-described example, a procedure for calculating a difference using the "diff" command, which is a command to calculate a difference in UNIX, has been described, various methods are available as a procedure to calculate a difference. However, an effect of the transmission apparatus 101 according to the exemplary embodiment does not depend on a procedure for calculating a difference. In other words, a procedure for calculating a difference is not limited to the above-described example.

The transmission apparatus 101 may, after the selection unit 102 reads out a message identifier MI from the history information 104, calculate a message identifier MI for a message transmitted by the information processing apparatus 107, and store the calculated message identifier MI and the received service identifier SI in association with each other in the history information 104.

Figure 7:
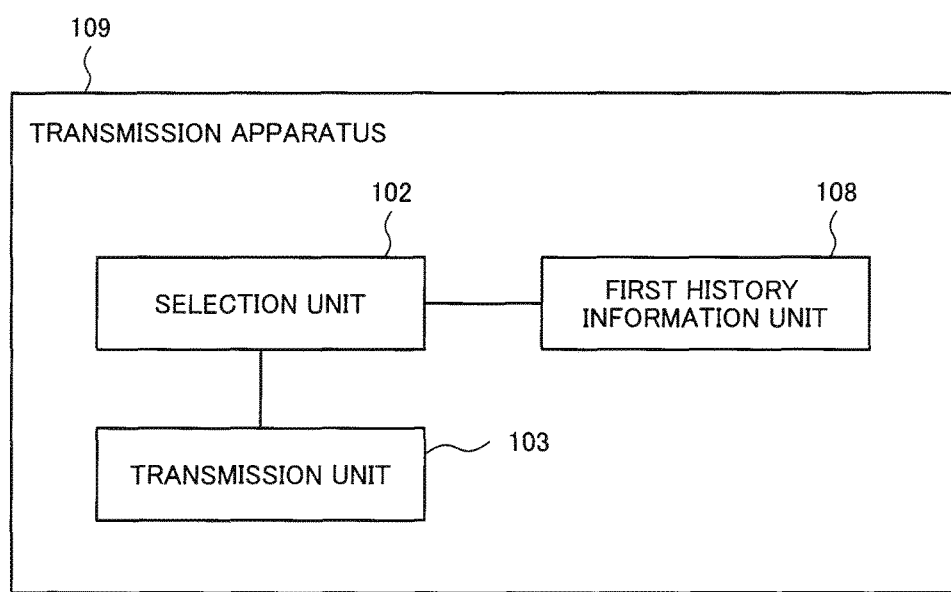
FIG. 7 is a block diagram illustrating a configuration under the condition where the transmission apparatus according to the first exemplary embodiment has the first history information unit.

Moreover, as illustrated in FIG. 7, the transmission apparatus 109 may include a first history information unit 108 which is able to store the history information 104. FIG. 7 is a block diagram illustrating a configuration under the condition where the transmission apparatus 109 according to the first exemplary embodiment has the first history information unit 108. In this case, the transmission apparatus 109 stores the history information 104, in which the calculated message identifier MI is associated with the received service identifier SI, in the first history information unit 108.

<Second Exemplary Embodiment>

Next, a second exemplary embodiment of the present invention based on the first exemplary embodiment mentioned above will be described.

The following description focuses on a characteristic part according to the exemplary embodiment and omits an overlapped description by assigning a configuration according to the exemplary embodiment, which is the same as the configuration according to the first exemplary embodiment, a code which is the same as the code of the same configuration according to the first exemplary embodiment.

Figure 8:
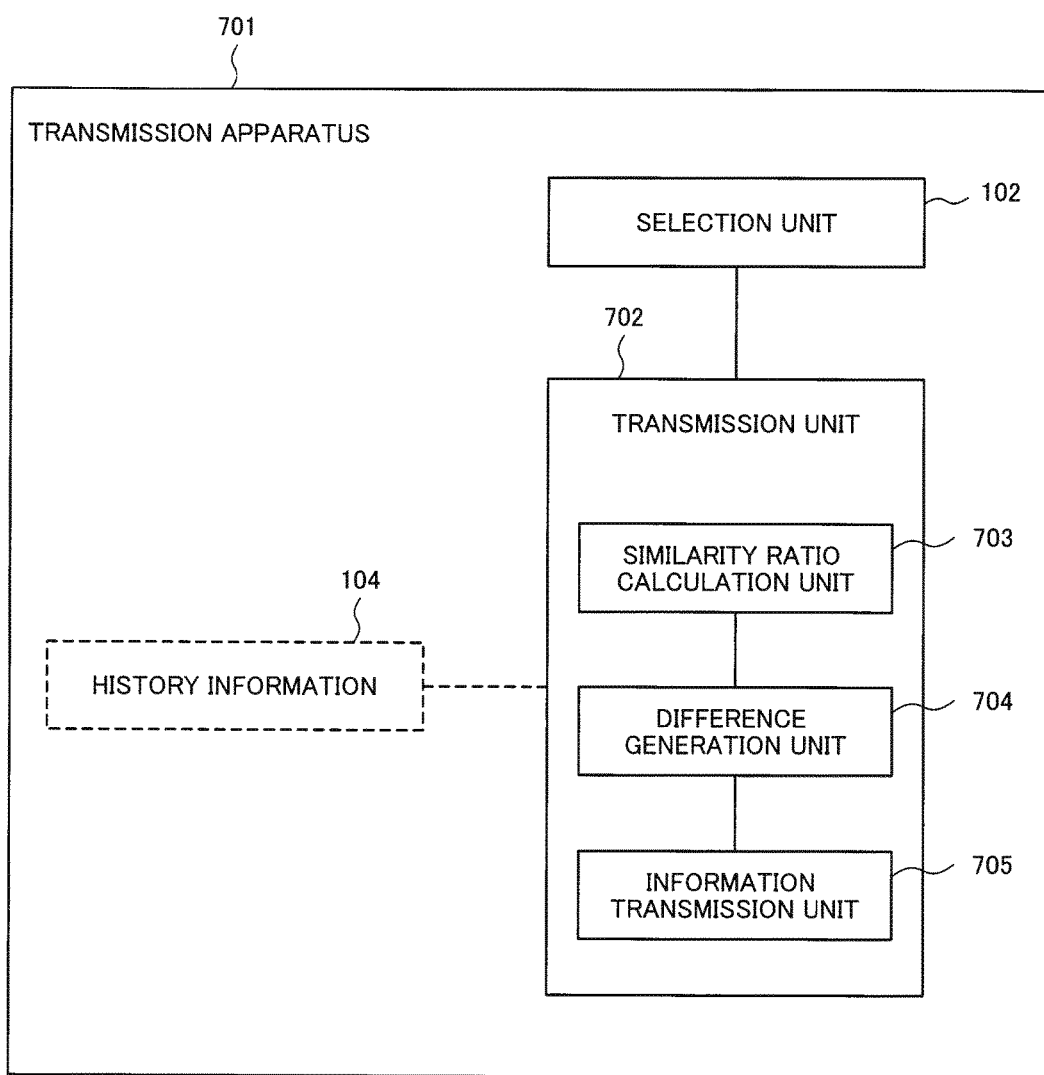
FIG. 8 is a block diagram illustrating a configuration of the transmission apparatus according to a second exemplary embodiment of the present invention.
Figure 9:
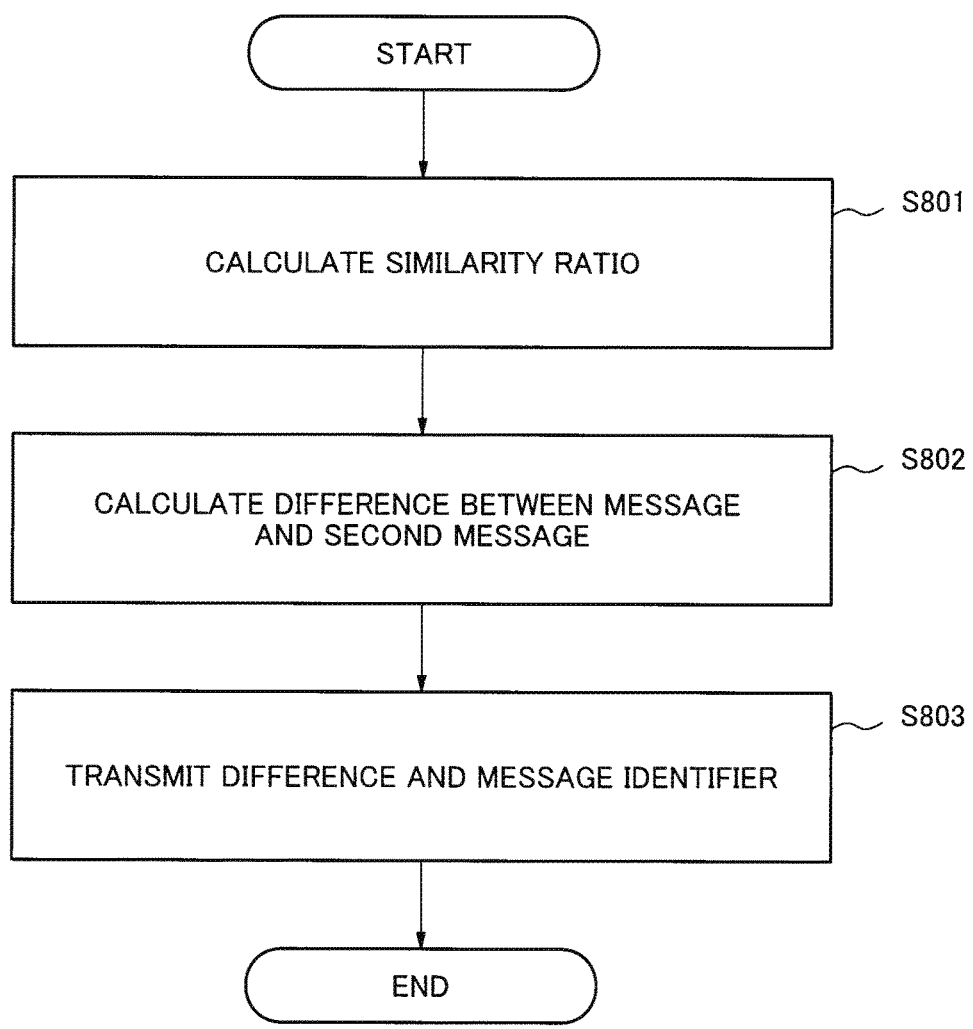
FIG. 9 is a flowchart illustrating a processing flow of the transmission apparatus according to the second exemplary embodiment.

A configuration of a transmission apparatus 701 according to the second exemplary embodiment and processing carried out by the transmission apparatus 701 will be described below with reference to FIGS. 8 and 9. FIG. 8 is a block diagram illustrating a configuration of the transmission apparatus 701 according to the second exemplary embodiment of the present invention. FIG. 9 is a flowchart illustrating a processing flow of the transmission apparatus 701 according to the second exemplary embodiment.

The transmission apparatus 701 according to this exemplary embodiment includes the selection unit 102 and a transmission unit 702.

The transmission unit 702 according to this exemplary embodiment also includes a similarity ratio calculation unit 703, a difference generation unit 704, and an information transmission unit 705.

First, the similarity ratio calculation unit 703 calculates a similarity ratio by following a procedure for calculating a similarity ratio as illustrated in the first exemplary embodiment (step S801).

In step S801, for example, the similarity ratio calculation unit 703 may select less than or equal to a predetermined number of message identifiers MI from among the message identifiers MI read out by the selection unit 102 and calculates similarity ratios for the selected message identifiers MI. If the number of message identifiers MI read out by the selection unit 102 is more than the predetermined number, the similarity ratio calculation unit 703 calculates similarity ratios for the predetermined number of message identifiers MI. Therefore, the number of times similarity ratios are calculated is further less than the case of the first exemplary embodiment. In other words, the transmission apparatus 701 according to this exemplary embodiment causes a further reduction in processing load (i.e. speeding up of processing) compared with the first exemplary embodiment.

Furthermore, the similarity ratio calculation unit 703 may halt (interrupt) the calculation processing of a similarity ratio if the calculated similarity ratio becomes more than or equal to a predetermined threshold value. The transmission unit 702 calculates (generates) a difference for a message the calculated similarity ratio of which is more than or equal to the predetermined threshold value. In this case, the number of times calculations of similarity ratios are carried out by the similarity ratio calculation unit 703 is also less than the number of message identifiers MI read out by the selection unit 102. In other words, the number of calculations of similarity ratios is further less than the case of the first exemplary embodiment.

For example, when the predetermined threshold value is 0.8, the similarity ratio calculation unit 703 halts the calculation processing if the calculated similarity ratio becomes 0.8 or more.

Moreover, the similarity ratio calculation unit 703 may halt the calculation processing of a similarity ratio if the calculated similarity ratio becomes more than or equal to a predetermined threshold value and select a message identifier MI for which a similarity ratio is to be calculated next if the similarity ratio is less than the predetermined threshold value. In this case, the similarity ratio calculation unit 703 halts the calculation processing of a similarity ratio if the number of times message identifiers MI are selected exceeds a predetermined number. With this procedure, the number of times calculations of similarity ratios are carried out by the similarity ratio calculation unit 703 becomes further less than the above-described example. In other words, by using the transmission apparatus 701 according to this exemplary embodiment, a further reduction in processing load (i.e. speeding up of processing) may be achieved compared with the first exemplary embodiment.

If the number of times message identifiers MI are selected exceeds a predetermined number, the information transmission unit 705 may transmit the message transmitted by the information processing apparatus 107 and the message identifier MI associated with the message to the reception unit 106.

Next, the difference generation unit 704 selects the largest similarity ratio among the similarity ratios calculated by the similarity ratio calculation unit 703 and calculates a difference between contents contained in the message that produces the largest similarity ratio (it is assumed that the message identifier MI is "A") and contents contained in the received message (step S802).

Next, the information transmission unit 705 transmits the difference and the message identifier MI of "A" to the reception unit 106 (step S803).

As described above, because the transmission apparatus 701 according to the second exemplary embodiment includes a similar configuration to the transmission apparatus of the first exemplary embodiment, the second exemplary embodiment provides advantages similar to the first exemplary embodiment. In other words, the transmission apparatus 701 according to second exemplary embodiment makes it possible to transmit information efficiently.

<Third Exemplary Embodiment>

Next, a third exemplary embodiment of the present invention based on the second exemplary embodiment mentioned above will be described.

The following description focuses on a characteristic part according to the exemplary embodiment and omits an overlapped description by assigning a configuration according to the exemplary embodiment, which is the same as the configuration according to the second exemplary embodiment, a code which is the same as the code of the same configuration according to the second exemplary embodiment.

Figure 10:
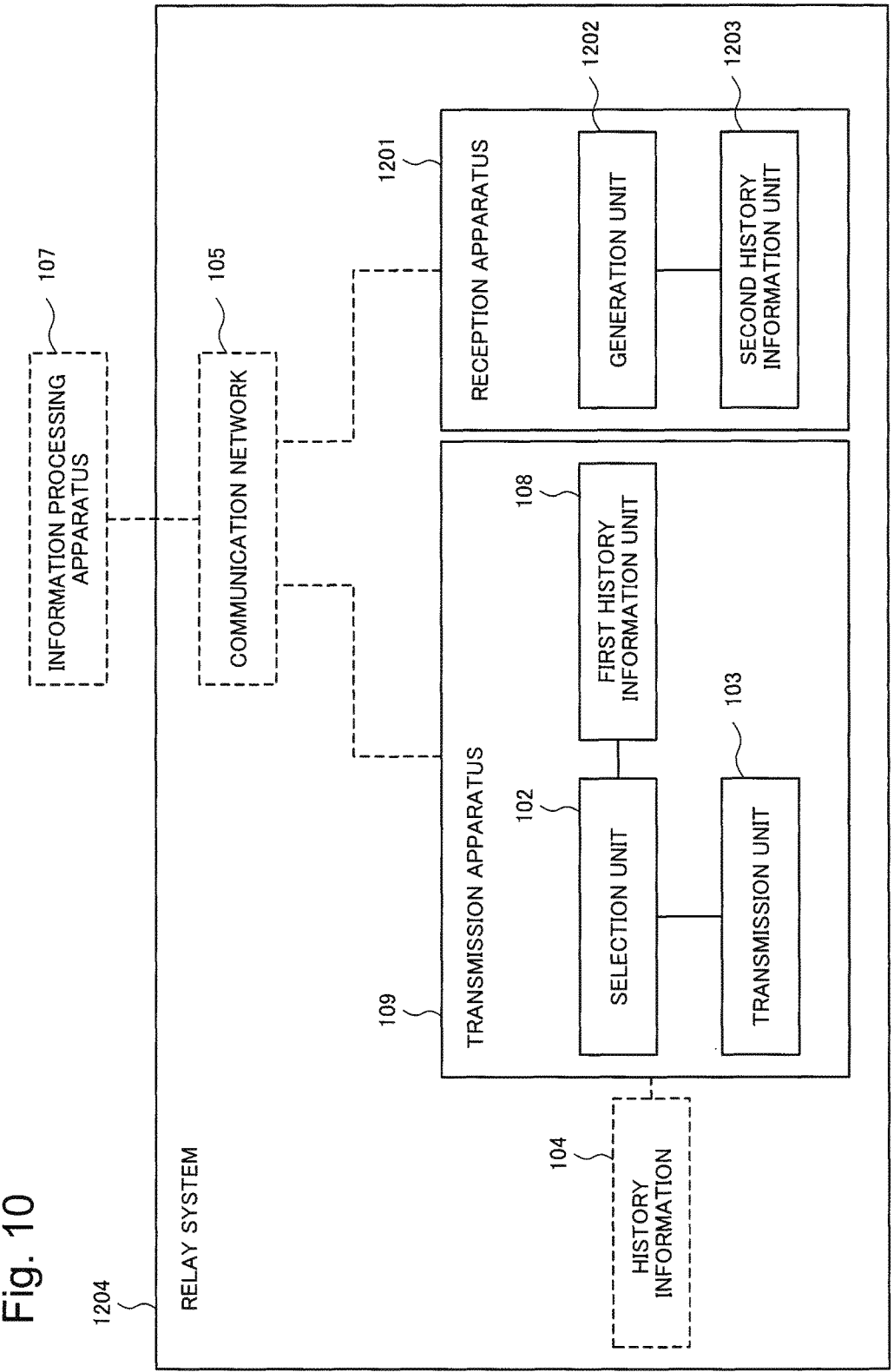
FIG. 10 is a block diagram illustrating a configuration of the relay system according to a third exemplary embodiment of the present invention.
Figure 11:
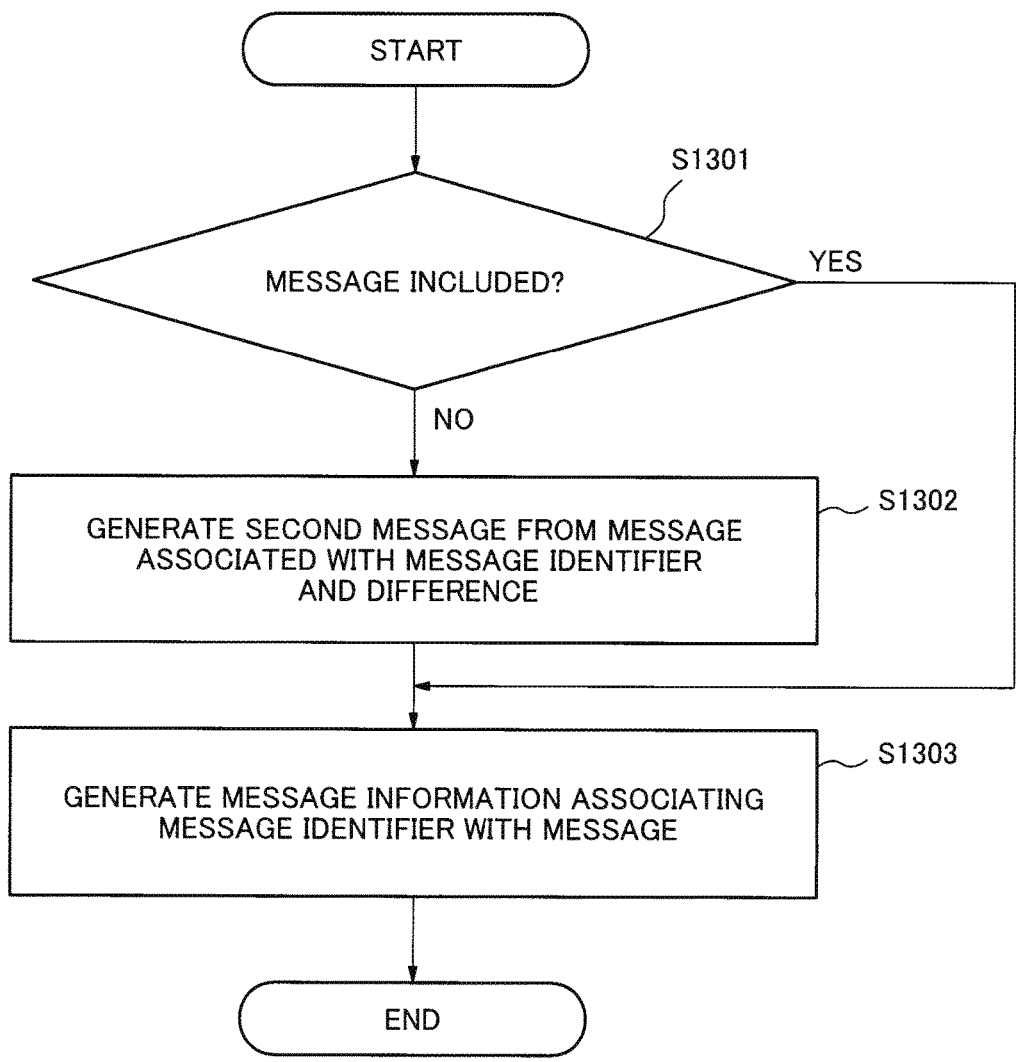
FIG. 11 is a flowchart illustrating a processing flow of the reception apparatus according to the third exemplary embodiment.

With reference to FIGS. 10 and 11, a configuration of a relay system 1204 according to the third exemplary embodiment and processing carried by a reception apparatus 1201 will be described below. FIG. 10 is a block diagram illustrating a configuration of the relay system 1204 according to the third exemplary embodiment of the present invention. FIG. 11 is a flowchart illustrating a processing flow of the reception apparatus 1201 according to the third exemplary embodiment.

The relay system 1204 according to the third exemplary embodiment includes a transmission apparatus 109 and the reception apparatus 1201. The reception apparatus 1201 according to the third exemplary embodiment includes a generation unit 1202 and a second history information unit 1203.

The relay system 1204 may include the communication network 105.

The transmission apparatus 109, the reception apparatus 1201, and the information processing apparatus 107 are able to transmit and receive information to/from one another via the communication network 105.

First, processing carried out by the reception apparatus 1201 if the transmission apparatus 109 transmits a message and a message identifier MI associated with the message to the reception apparatus 1201 will be described.

First, the reception apparatus 1201 receives the message and the message identifier MI.

Next, the generation unit 1202 decides whether or not information the reception apparatus 1201 receives includes a message (step S1301). In this example, because the generation unit 1202 decides that the information includes a message (decides YES in step S1301), the generation unit 1202 generates message information which associates the message identifier MI with the message (step S1303). The generation unit 1202 stores the message information in the second history information unit 1203.

Next, processing carried out by the reception apparatus 1201 if the transmission apparatus 109 transmits a message identifier MI and a difference to the reception apparatus 1201 will be described.

First, the reception apparatus 1201 receives the message identifier MI and the difference.

Next, because the generation unit 1202 decides that the information received by the reception apparatus 1201 does not include a message (decides NO in step S1301), the generation unit 1202 generates a message (in this example, a second message) on the basis of a message associated with the message identifier MI and the difference (step S1302). Then, the generation unit 1202 generates message information which associates a message identifier MI to be generated by following a procedure, which will be described later, with the second message (step S1303). The generation unit 1202 stored the generated message information in the second history information unit 1203.

The generation unit 1202 may generate a message identifier MI by following the same procedure as the method by which the transmission apparatus 109 generates a message identifier MI, or may receive a message identifier MI generated by the transmission apparatus 109.

Because the relay system 1204 according to the third exemplary embodiment includes a similar configuration to the first exemplary embodiment, the third exemplary embodiment provides advantages similar to the first exemplary embodiment. In other words, the relay system 1204 according to the third exemplary embodiment makes it possible to transmit information efficiently.

Moreover, the reception apparatus 1201 reproduces a message of transmission target on the basis of information such as a difference. Therefore, the information processing apparatus 107 is able to transmit information efficiently by using the relay system 1204 as an intermediary.

(Example of Hardware Configuration)

An example of a configuration of hardware resources, which realize the transmission apparatus according to each exemplary embodiment of the present invention mentioned above by use of one calculation processing apparatus (information processing apparatus or computer), will be described in the following. Here, the memory management control system may be realized by using at least two calculation processing apparatuses physically or functionally. Moreover, the memory transmission apparatus may be realized as a dedicated apparatus.

Figure 12:
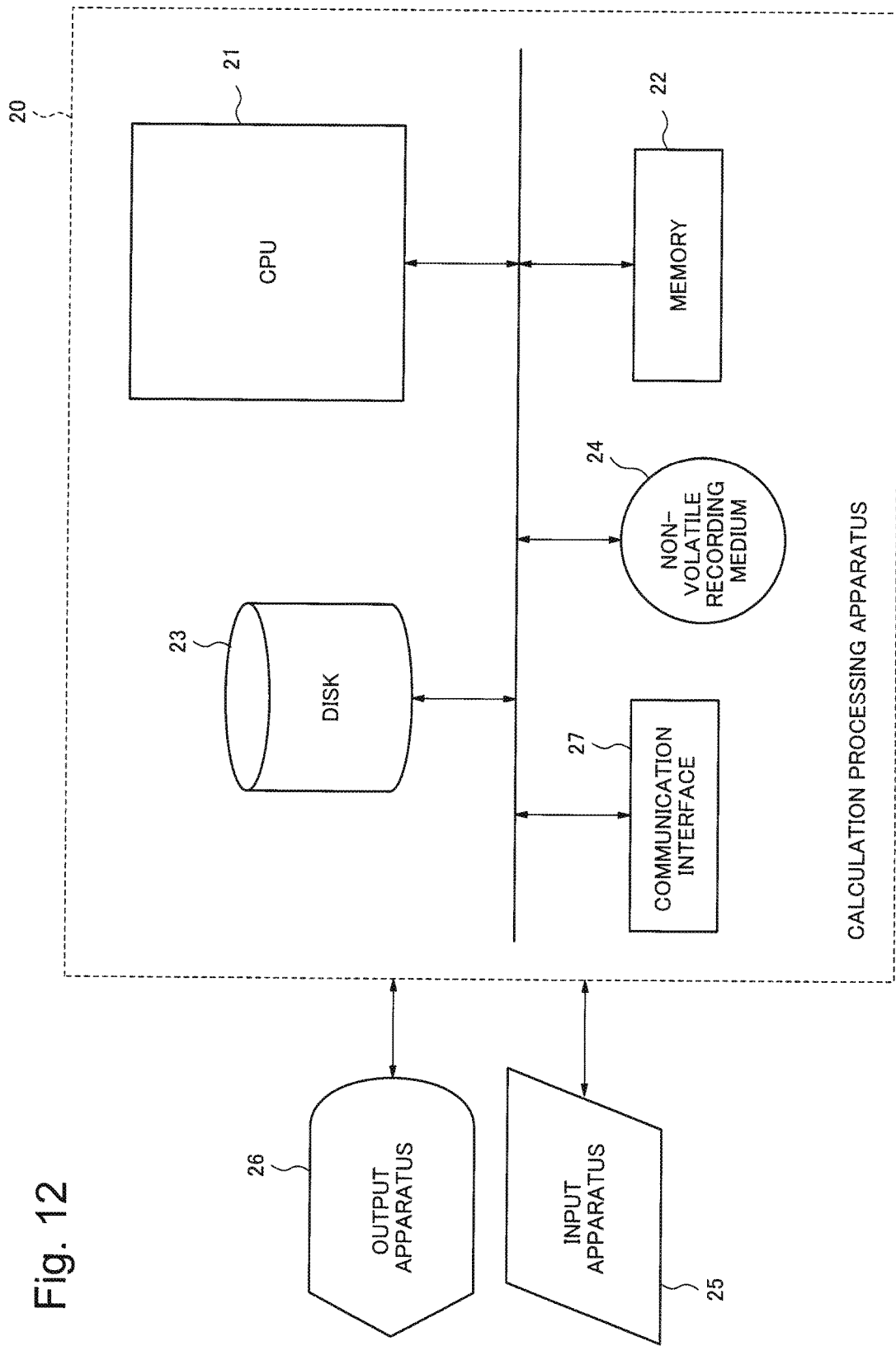
FIG. 12 is a schematic diagram showing a hardware configuration of a calculation processing apparatus which can realize the transmission apparatus according to the first exemplary embodiment to the third exemplary embodiment.

FIG. 12 is a schematic diagram showing a hardware configuration of a calculation processing apparatus which can realize the transmission apparatus according to the first exemplary embodiment to the third exemplary embodiment. A calculation processing apparatus 20 includes Central Processing Unit (hereinafter, referred to as "CPU") 21, a memory 22, a disk 23, a non-volatile recording medium 24, an input apparatus 25, an output apparatus 26 and an communication interface 27. The calculation processing apparatus 20 is able to communicate with another calculation processing apparatus via the communication interface 27.

The non-volatile recording medium 24, which is computer-readable medium such as Compact Disc, Digital Versatile Disc, Blu-ray Disc, USB (Universal Serial Bus) memory and Solid State Drive or the like, stores the program even when an electric power is not supplied, and the non-volatile recording medium 24 is portable. The non-volatile recording medium 24 is not limited to the medium mentioned above. Moreover, instead of using the non-volatile recording medium 24, the program may be carried through a communication network.

That is, when CPU 21 executes a software program (computer program: hereinafter, abbreviated as "program") which the disk 23 stores, CPU 21 copies the program in the memory 22 and executes a calculation process. CPU 21 reads data, which is necessary to execute the program, from the memory 22. In the case that displaying is needed, CPU 21 makes the output apparatus 26 display an output result. In the case that the program is inputted from an outside, CPU 21 reads the program from the input apparatus 25. CPU 21 interprets and executes a transmission program (FIG. 2, FIG. 9, and FIG. 10) which exists in the memory 22 and which is corresponding to the function (process) of each unit which is shown in FIG. 1, FIG. 7, FIG. 8 or FIG. 10 mentioned above. CPU 21 executes the processes, which have been described in each exemplary embodiment of the present invention mentioned above, in sequence.

That is, in this case, it is conceivable that the present invention can be achieved by the memory management control program. Moreover, it is also conceivable that the present invention can be achieved by a computer-readable nonvolatile recording medium which records the memory management control program.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

REFERENCE SIGN LIST 101 transmission apparatus
102 selection unit
103 transmission unit
104 history information
105 communication network
106 reception apparatus
107 information processing apparatus
108 first history information unit
109 transmission apparatus
701 transmission apparatus
702 transmission unit
703 similarity ratio calculation unit
704 difference generation unit
705 information transmission unit
1201 reception apparatus
1202 generation unit
1203 second history information unit
1204 relay system
20 calculation processing apparatus
21 CPU
22 memory
23 disk
24 non-volatile recording medium
25 input apparatus
26 output apparatus
27 communication interface

What is claimed is:

1. A transmission apparatus comprising:
a selection unit that selects message identifiers associated with a specific service identifier identifying a specific service as first message identifiers on a basis of history information where a service identifier identifying a service is associated with a message identifier identifying a message; and
a transmission unit that selects a message resembling a second message related to the specific service as a third message, from messages identified by the first message identifiers, calculates a difference between the second message and the third message, and transmits the calculated difference and a specific message identifier identifying the third message via a communication network.

2. The transmission apparatus according to claim 1,
wherein the transmission unit includes:
a similarity ratio calculation unit that repeats processing to calculate a similarity ratio while the similarity ratio between the first message and the second message is smaller than a predetermined threshold value,
a difference generation unit that generates the calculated difference between the third message, which third message is a message producing the similarity ratio larger than the predetermined threshold value, and the second message; and
an information transmission unit that transmits the difference and the specific message identifier.

3. The transmission apparatus according to claim 1,
wherein the transmission unit includes:
a similarity ratio calculation unit that calculates similarity ratios between the first messages and the second message a predetermined number of times,
a difference generation unit that generates the calculated difference between the third message, which third message is the message producing a largest similarity ratio among the similarity ratios as the third message, and the second message, and
an information transmission unit that transmits the calculated difference and the specific message identifier.

4. The transmission apparatus according to claim 1,
wherein the transmission unit includes:
a similarity ratio calculation unit that repeats calculation processing to calculate a similarity ratio up to a predetermined number of times if the similarity ratio between the first message and the second message is smaller than a predetermined threshold value, and interrupts the calculation processing if the similarity ratio is larger than the predetermined threshold value,
a difference generation unit that generates the calculated difference between the third message, which third message is the message the similarity ratio of which is larger than the predetermined threshold value, and the second message, and
an information transmission unit that transmits the calculated difference and the specific message identifier.

5. A relay system, comprising:
the transmission apparatus according to claim 1; and
a reception apparatus that receives the calculated difference and the specific message identifier via the communication network and generates the second message based on a message associated with the received specific message identifier and the calculated difference.

6. The relay system according to claim 5,
wherein the reception apparatus includes a second history information unit that is able to store the message and the message identifier in association with each other, and
the reception apparatus stores the second message and the identifier identifying the second message in association with each other in the second history information unit and reads out a message associated with the specific message identifier from the second history information unit.

7. A transmission method to be carried out by using an information processing apparatus, the transmission method comprising:
selecting message identifiers associated with a specific service identifier identifying a specific service as first message identifiers on a basis of history information where a service identifier identifying a service is associated with a message identifier identifying; and
selecting a message resembling a second message related to the specific service as a third message, from messages identified by the first message identifiers, calculating a difference between the second message and the third message, and transmitting the calculated difference and a specific message identifier identifying the third message via a communication network.

8. A non-transitory computer-readable storage medium storing a transmission program that causes a computer to carry out:
a selection function that selects message identifiers associated with a specific service identifier identifying a specific service as first message identifiers on a basis of history information where a service identifier identifying a service is associated with a message identifier identifying a message; and
a transmission function that selects a message resembling a second message related to the specific service as a third message, from messages identified by the first message identifiers, calculates a difference between the second message and the third message, and transmits the calculated difference and a specific message identifier identifying the third message via a communication network.

9. The non-transitory computer-readable storage medium storing the transmission program according to claim 8,
wherein the transmission function includes:
a similarity ratio calculation function that repeats processing to calculate a similarity ratio while the similarity ratio between the first message and the second message is smaller than a predetermined threshold value,
a difference generation function that generates the calculated difference between the third message, which third message is a message producing the similarity ratio larger than the predetermined threshold value, and the second message; and
an information transmission function that transmits the difference and the specific message identifier.

10. The non-transitory computer-readable storage medium storing the transmission program according to claim 8,
wherein the transmission function comprises:
a similarity ratio calculation function that calculates similarity ratios between the first messages and the second message a predetermined number of times;
a difference generation function that, assuming the message producing a largest similarity ratio among the similarity ratios as the third message, generates the calculated difference between the third message and the second message; and
an information transmission function that transmits the difference and the specific message identifier.

* * * * *